Fig. 2.

No. 798,516. PATENTED AUG. 29, 1905.
A. LATHAM & G. T. FUERY.
MACHINE FOR MAKING NAILS AND SIMILAR ARTICLES.
APPLICATION FILED SEPT. 10, 1903.

Witnesses
Inventors.
Albert Latham
George T. Fuery.
By James L. Norris
Atty.

No. 798,516. PATENTED AUG. 29, 1905.
A. LATHAM & G. T. FUERY.
MACHINE FOR MAKING NAILS AND SIMILAR ARTICLES.
APPLICATION FILED SEPT. 10, 1903.

Witnesses
W. B. Keefe
Robert Everitt

Inventors
Albert Latham
George T. Fuery.
By James L. Norris.
Atty.

No. 798,516. PATENTED AUG. 29, 1905.
A. LATHAM & G. T. FUERY.
MACHINE FOR MAKING NAILS AND SIMILAR ARTICLES.
APPLICATION FILED SEPT. 10, 1903.

Witnesses.

Inventors
Albert Latham
George T. Fuery.
By James L. Norris.
Att'y.

No. 798,516. PATENTED AUG. 29, 1905.
A. LATHAM & G. T. FUERY.
MACHINE FOR MAKING NAILS AND SIMILAR ARTICLES.
APPLICATION FILED SEPT. 10, 1903.

No. 798,516. PATENTED AUG. 29, 1905.
A. LATHAM & G. T. FUERY.
MACHINE FOR MAKING NAILS AND SIMILAR ARTICLES.
APPLICATION FILED SEPT. 10, 1903.

Witnesses
Inventors.
Albert Latham
George T. Fuery.
By James L. Norris,
Att'y.

UNITED STATES PATENT OFFICE.

ALBERT LATHAM AND GEORGE T. FUERY, OF BIRMINGHAM, ENGLAND, ASSIGNORS OF ONE-THIRD TO HIRAM EMERY FULLER, OF BIRMINGHAM, ENGLAND.

MACHINE FOR MAKING NAILS AND SIMILAR ARTICLES.

No. 798,516. Specification of Letters Patent. Patented Aug. 29, 1905.

Application filed September 10, 1903. Serial No. 172,708.

*To all whom it may concern:*

Be it known that we, ALBERT LATHAM, a citizen of the United States, and GEORGE THOMAS FUERY, a subject of the King of Great Britain, both residing at 11 Burlington Chambers, New street, Birmingham, in the county of Warwick, England, have invented certain new and useful Improvements in Machines for Making Nails and Similar Articles, of which the following is a specification.

This invention relates to what shall be for convenience termed a "machine for making nails and similar articles."

The said invention will be hereinafter clearly described by the annexed drawings, wherein—

Fig. 3, a vertical sectional view of Fig. 1, taken on the dotted line C C looking toward the right. Fig. $3^a$ is a horizontal sectional detailed view of a part of the machine.

Figure 1:
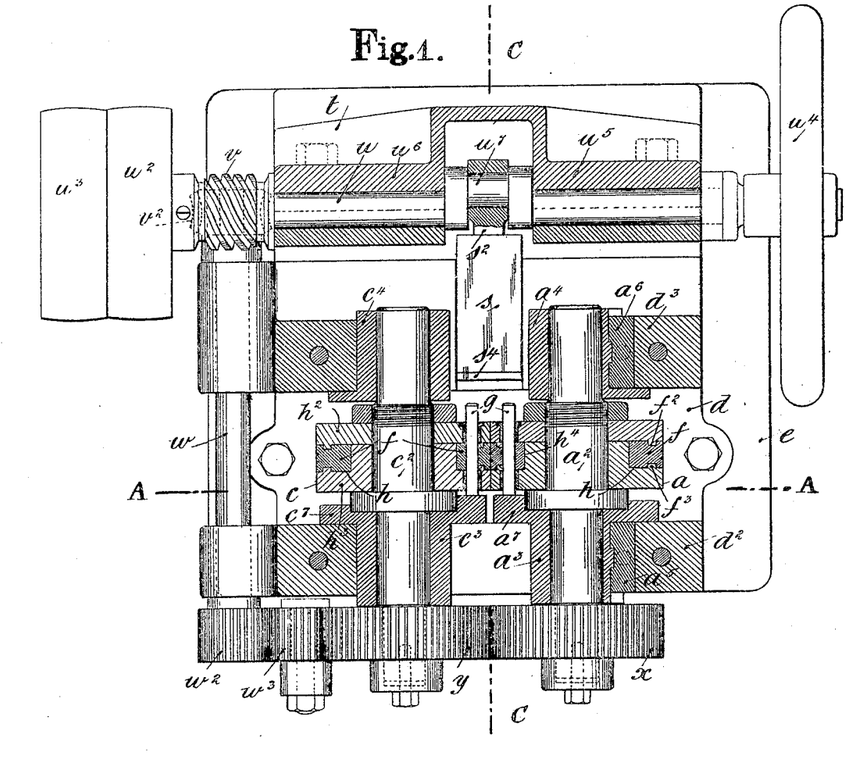
Figure 1 is a sectional plan view of the machine.
Figure 2:
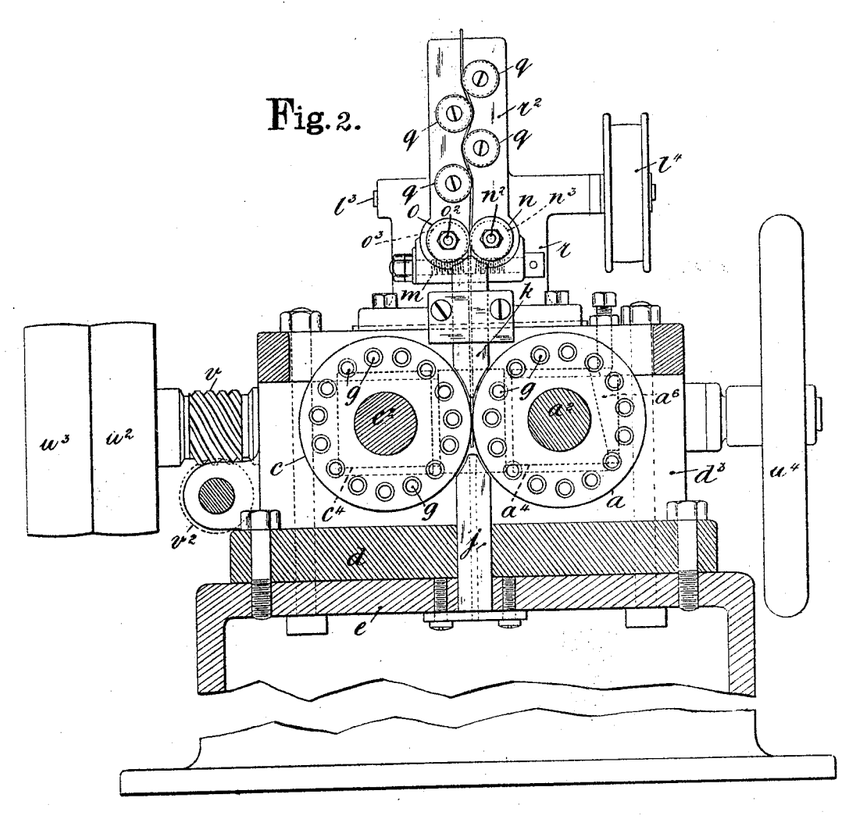
Fig. 2 is a vertical sectional view of Fig. 1, taken on the dotted line A A.
Figures 3, 3A:
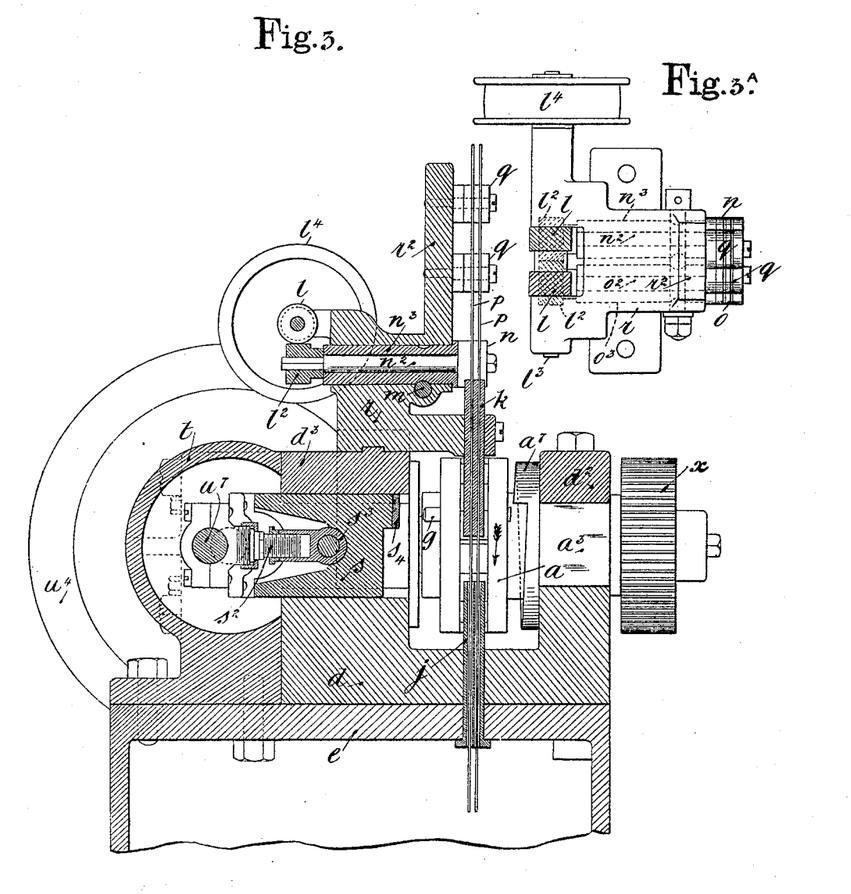

With reference to Figs. 1 to 3, $a$ and $c$ are two cylindrical rolls carried rigid upon shafts $a^2 c^2$, journaled at their ends in bearing-blocks $a^3 a^4 c^3 c^4$, fitted to upright rigid portions $d^2 d^3$ of a frame $d$, which is bolted a fixture upon a table or base $e$. The said rolls will be hereinafter fully described with reference to other figures of the drawings; but it may here be said that they work together to shape the nail or other article between them and within their nip and that they each carry a series of heading-wedges $g$. The bearing-blocks $a^3 a^4 c^3 c^4$ are rigidly supported by the uprights $d^2 d^3$; but the bearing-blocks $a^3 a^4$ are able to be moved by wedges $a^5 a^6$ to set up the roll $a$ to the roll $c$ for the purpose of giving a greater or less nip on the wire which passes between the rolls. The bearing-blocks $a^3 c^3$ carry on their inner sides, so as to be concentric with the rolls, stationary face-cams $a^7 c^7$, which are used to return the wedges $g$, hereinafter described, into the positions represented in Fig. 1 after they have made their heading movement, this returning of the wedges by the cams being gradual. The shafts $a^2 c^2$ are geared together by toothed wheels $x y$, one of which is fast upon each shaft end. The toothed wheel $y$ is driven from the counter-shaft $w$, journaled on the machine's frame, by two toothed gears $w^2 w^3$, the last gear being an intermediate gear. The counter-shaft $w$ is driven from a main or crank shaft $u$ by a worm-gear $v v^2$, this crank-shaft being fitted with fast and loose pulleys $u^2 u^3$ and a fly-wheel $u^4$ and being supported in bearings $u^5 u^6$ of a detachable casting $t$, which is bolted rigidly to the frame $d$. The crank $u^7$ of the crank-shaft $u$ works a heading-ram $s$, which is suitably guided in the frame $d$ to move onto the nip of the rolls $a$ and $c$ for the purpose of giving the wedges $g$ a blow to force them to make their heading movement, hereinafter clearly described. The ram $s$ is adjustable in respect of the throw of the crank $u^7$, as will be clearly seen from Fig. 3, it being connected to the said crank by a connecting-rod $s^2$, which is adjustable as to length. The one end $s^3$ of the connecting-rod $s^2$ is swivelly coupled to the ram $s$. The ram makes a straight line movement parallel with the shafts $a^2 c^2$, and its face is covered with hard steel $s^4$.

Above the rolls $a$ and $c$ is provided a wire-feeding mechanism and wire-straightening devices, these features being clearly represented by Figs. 2 and 3 and also by Fig. $3^a$, which is a plan of the said mechanism and devices separate from the other portion of the machine. A frame $r$ is rigidly bolted to the upright $d^3$ of the frame $d$, but is capable of adjustment on said upright in a direction at right angles to the shafts of the rolls. Upon an upright extension $r^2$ of this frame are provided a number of rotating disks $q$, between which the wires $p$ $p$ to form the nails run. The arrangement of the disks $q$ $q$ are so that the wires run zigzag, as shown in Fig. 2, they thereby becoming straightened. Upon the frame $r$, below the disks $q$, are provided two wire-feed disks $n$ $o$, between which the wires from the straightening devices pass and are gripped. These wire-feed disks are carried upon the one end of spindles $n^2$ $o^2$, which have an eccentric bearing in sleeves $n^3$ $o^3$, fitted to the frame $r$ to turn for adjustment, the said sleeves after adjustment being clamped fixtures, the said adjustment and clamping being accomplished by a right and left hand screw $m$, engaging portions of both sleeves and fitted with a lock-nut and being for the purpose of effecting a more or less grip upon the wires being fed to the rolls $a$ and $c$, it being possible to either feed the wires to the rolls or to retard their movement to the rolls if the rolls should exert a pull on the wires. The shafts $n^2$ $o^2$ are worked by worm gears $l$ $l$ $l^2$ $l^2$, the gear-wheels $l$ being upon a spindle $l^3$, driven from a pulley $l^4$. The turning of the screw $m$ moves simultaneously the sleeves $n^3$ $o^3$, and therefore the feed-disks $n$ $o$. Below the disks $n$ $o$ is a guide-tube $k$ to direct the wires to the nip of the rolls, this tube being carried upon the frame $r$. A somewhat similar tube $j$ is provided below the rolls to guide the nails away from the nip of the roll, this tube $j$ being suitably carried in the frame $d$ and the base of the machine.

It is to be pointed out that in Fig. 1 only two of the heading-wedges $g$ are shown and in Fig 3 one wedge, but that in Fig. 2 the whole of them are represented.

Figure 4:
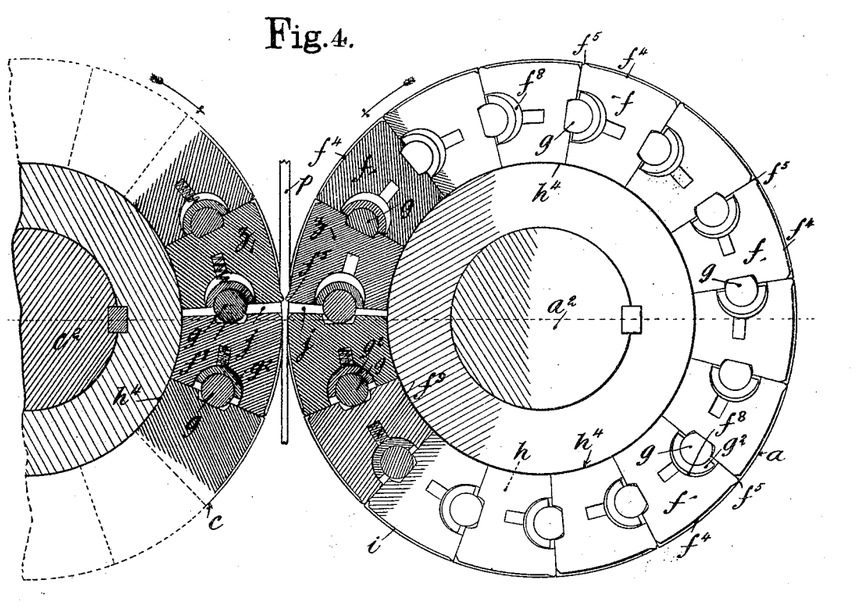
Figs. 4 and 5, a side section and a plan section of the rolls of the machine only and the parts they carry.
Figure 5:
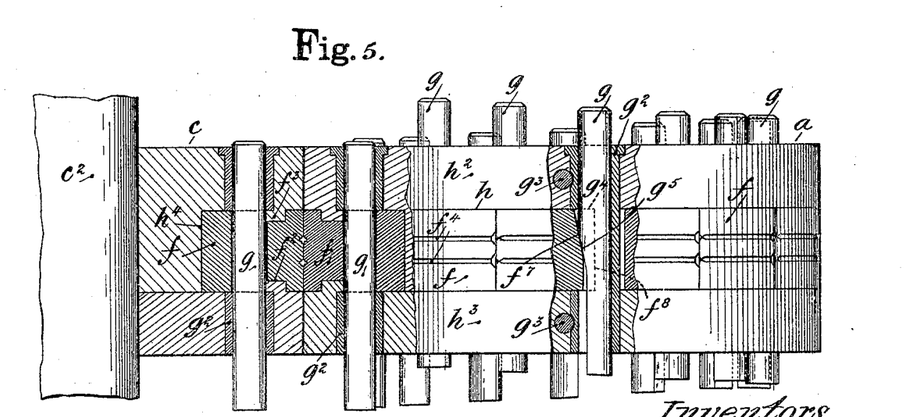
Figure 15:
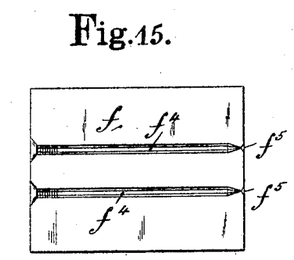
Figs. 15 and 16, a plan and side section of one of the dies carried by the rolls; Fig. $16^A$, a representation of a nail rolled.
Figure 16:
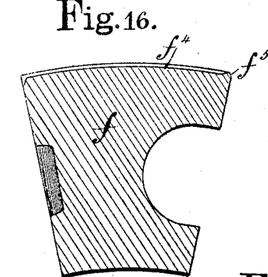

With reference to Figs. 1, 4, and 5 the rolls $a$ and $c$ are each built up and furnished as follows: The active shaping-surface $i$ is composed of a number of movable shaping-dies $f$, which are carried by the said roll to partake of its rotary movement, but in addition so that each of them can make a heading or similar movement in or upon the roll independent or separate from the rotation of the roll. The dies illustrated are radially cut segments, each capable of making a circumferential sliding movement within a concentric groove $h$, provided between the two cheeks $h^2$ $h^3$, forming the body of the rolls, this building up of the rolls being generally represented in Fig. 1, which also shows clearly how the dies $f$ are by concentric groove and tongue portions $f^2$ $f^3$ held within the concentric groove $h$ to bear hard upon a concentric boss or hub $h^4$ in the middle of the roll-body. The roll $a$, Fig. 4, carries fifteen independent shaping-dies $f$, which combine to complete the shaping circumference of the roll less a small space $j$, which is the measure of any movement for all the dies and which every die makes fully in the heading movement of a nail. Each die $f$ has upon its active face $f^4$ a cavity or groove to form one-half of the point, shank, and head of a nail, and also has upon it a beveled forward edge $f^5$ adjacent to the point-forming portion of the cavity, this edge making the die strong at its most active point. The cavity and the beveled forward edge will be clearly seen from Figs. 15 and 16. The dies $f$ have no separate movement within the groove $h$ except the heading movement, and it is to be here pointed out that these dies in pairs shape the shank, point, head, and practically cut off from the wire a nail of the kind represented by Fig. 16$^a$, which, owing to the beveled forward edge $f^5$ on the die, has a small teat or knob $f^6$ on the face of its head. The radial faces of the dies are quite true, so that the one die can come quite close to the other. The dies $f$ are caused to make their heading movement in the groove $h$ at the required time by the heading-wedges $g$, which are operated by a blow of the heading-ram $s$ and by the cams $a^7$ $c^7$. Each die has a wedge $g$ at the back of it, this wedge working in a steel bush $g^2$, let into the cheeks of the roll parallel with the roll's shaft and being adjustably fixed within the said cheeks by pins $g^3$, the said bush being cut away at $g^4$ to accommodate the dies. The inclined portion $g^5$ of the wedge, which bears against an inclined portion $f^4$ on the back of the die, is arranged so that the die is struck at a point midway in its depth, the bush $g^2$ being arranged in the cheeks of the roll accordingly. The forward face of each die is cut away at $f^8$ to accommodate the bush of the preceding wedge, but this cutting away is such that in the heading movement the die is driven up to the bushing as a stop. A spring $f^9$ may be arranged between each die and bushing to force the die rearwardly from the bushing, this in case the dies should not of themselves be sufficiently heavy and free in the groove $h$ to fall back. The heading-wedges $g$ can turn slightly in the bushes $g^2$ as they make their heading movement. The cams $a^7$ $c^7$ are simply for returning the wedges to their original position after they have made their heading movement, so that they are in the right positions again for being operated by the ram $s$.

Figure 6:
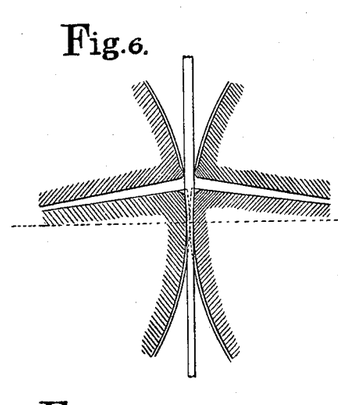
Figs. 6, 7, and 8 are diagrams showing on a large scale how the shaping of the nail from the wire takes place.
Figure 7:
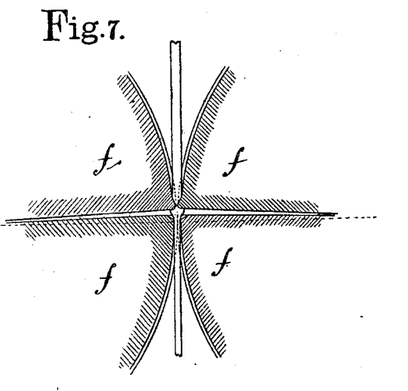
Figure 8:
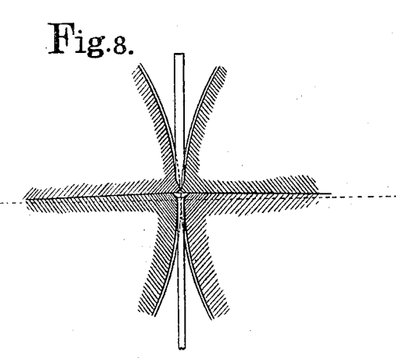

Figs. 6, 7, and 8 in stages show how the heading of the nail and also the pointing of the next is brought about by the heading movement of a pair of dies; but it may here be said with reference to Fig. 4 that assuming the rolls $a$ and $c$ are rotating in the directions of the arrows the pair of dies $z$ $z$ are the ones which are just prepared to make their heading movement, thereby taking up the heading-space $j$ and leaving it at the back of them for the next pair of dies in succession to take up by their heading movement.

Figure 9:
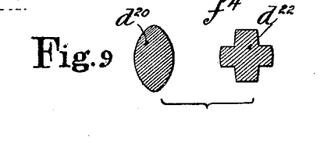
Figs. 9, 10, 11, and 12 are sections of the wire and of the finished nail.
Figure 10:
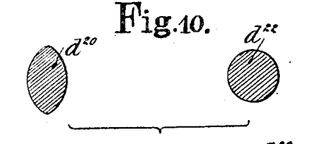
Figure 11:
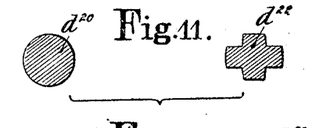
Figure 12:
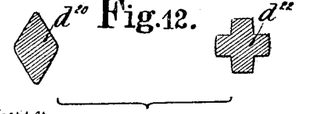
Figure 13:
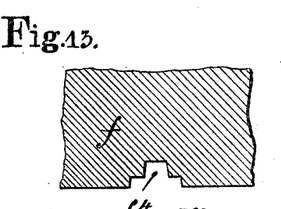
Figs. 13 and 14 are detail sections of the rolls.

Fig. 9 shows at $d^{20}$ the cross-section of the wire before shaping and at $d^{22}$ the cross-section of the shaped rolled nail, there being a cross-sectional displacement of metal in the rolling operation. This is very desirable to enable the rolls to take a good nip on the wire during the heading movement and to assist the displacement of metal in the formation of the head. Figs. 10, 11, and 12 show similar sections, as Fig. 9.

In the drawings the shaping-dies $f$ are each represented with a plurality of nail-shaping cavities and parts, and this is desirable, but there may be only one cavity, the wire-feed being accordingly.

Figure 14:
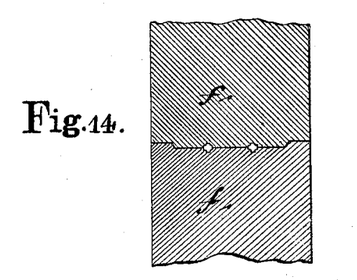

In Fig. 14 the dies of each roll $a$ and $c$ are made to interlock with each other to keep the said dies linable laterally.

Figure 17:
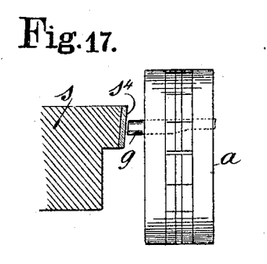
Fig. 17 is a diagram of one of the rolls and the heading-ram.

In Fig. 17 the ram $s$ has its hammering-face $s^4$ inclined slightly to the inclined adjacent end of the heading-wedge $g$, carried by the roll, this to support the wedges against a tendency to sheer off during their heading movement.

Figure 18:
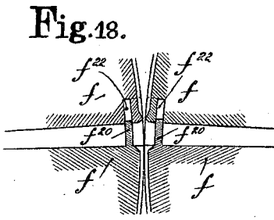
Figs. 18, 19, and 20 are sectional diagrammatic modifications of the shaping-dies.
Figure 19:
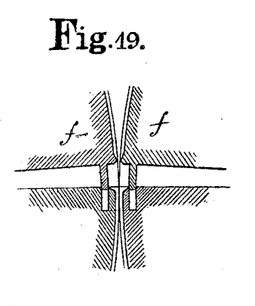
Figure 20:
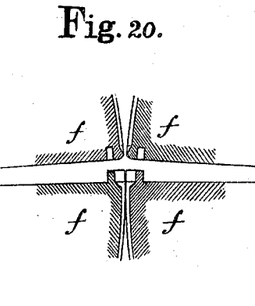

Figs. 18, 19, and 20 show how a part of the dies $f$ may be let into the adjacent dies to insure the metal displaced in the heading movement flowing into the head-forming cavity. Figs. 18 and 19 are alternate ways of letting one die fully into the adjacent die for the entire heading-space, while Fig. 20 shows one die engaging the recess of the other die after half the heading of the nail has taken place. The one die carries a half-tube $f^{20}$ and the other die a half-tubular recess $f^{22}$, as shown in Fig. 18.

Figure 21:
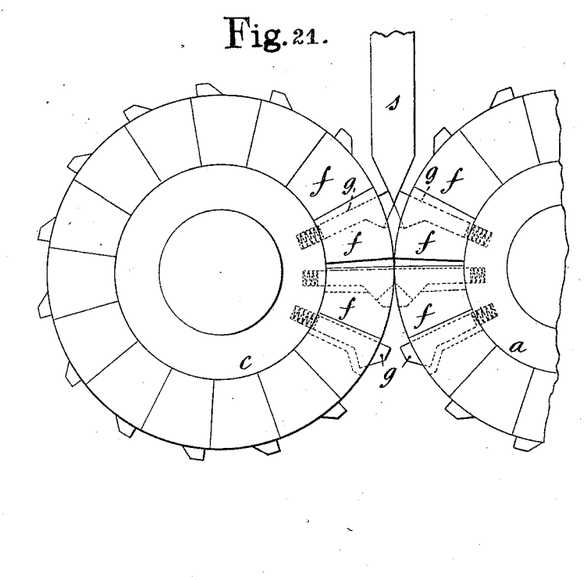
Figs. 21 and 22 are side views and a part plan of a modified means for operating the shaping-dies.
Figure 22:
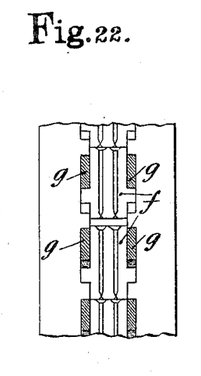

In Figs. 21 and 22 the dies $f$ are provided in the rolls as aforesaid; but the wedges $g$ work radially to give them their heading movement, the wedges being moved by a suitable ram $s$.

Figure 23:
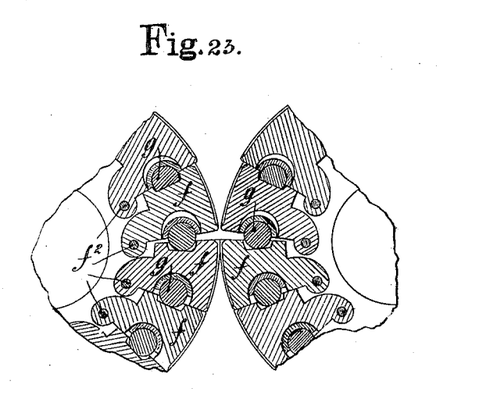
Fig. 23 is a broken section of the rolls, showing a modified form of moving the shaping-dies.

In Fig. 23 the dies $f$ swing on the rolls at $f^2$ to make their heading movement, the swinging being brought about by the transverse wedges $g$, as aforesaid.

Figure 24:
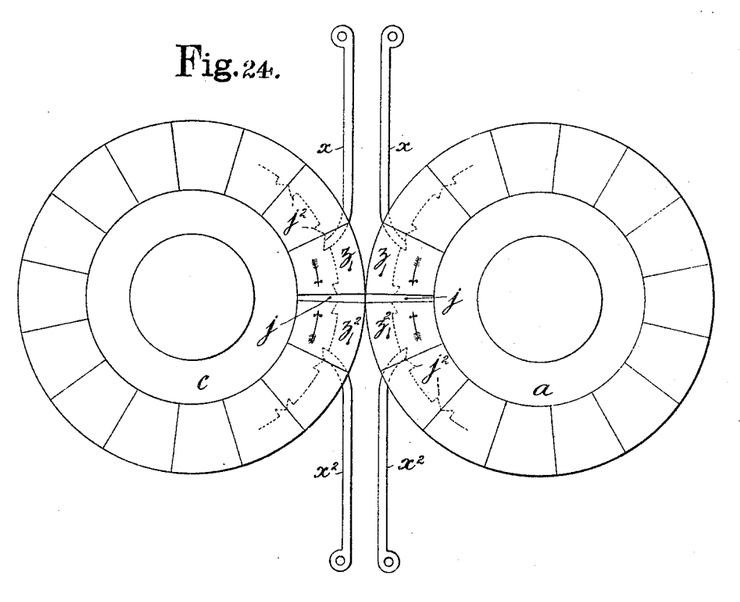
Figs. 24 and 25 are side views and a section of a modified arrangement for moving the shaping-dies and the rolls carrying them.
Figure 25:
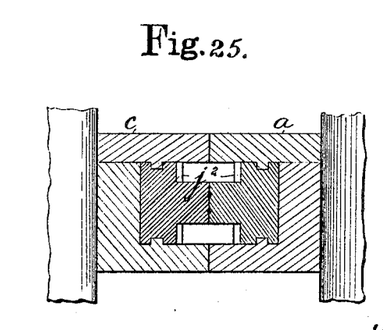

In Figs. 24 and 25 the dies $f$ move one pair forward and another pair rearward simultaneously to effect the heading of the nail. The pair $z\ z$ move forward and the pair $z^2\ z^2$ move rearward by the simultaneous operation of the pawls $x\ x\ x^2\ x^2$, which has the effect of taking up the heading-space $j$, after which the pawls $x^2\ x^2$ are automatically taken out of action, so that the pair of dies $z\ z$ can roll the shank of the next nail by the forcing farther forward of the pawls $x\ x$, which afterward retreat to lay hold of the next and succeeding pair of dies. The pawls engage ratchet-teeth $j^2$ on each and every die.

The action of the machine is that the wires are fed from reels between the rollers $q$ and $o$ and down the guide-tube $k$ to between the rolls $a$ and $c$, where it is gripped by the dies on the periphery of the rolls, the point of the nail being formed first. As the rolls continue to rotate and bring the head-forming part of the pair of dies near the nip of the rolls the back pair of dies are forced forward by their respective wedges, which receive a blow from the ram $s$, thereby forming the head of the nail, which then comes out from the rolls on the other side opposite where the wire has been fed.

More than two rolls may according to the invention be used in a machine, the shaping-cavities in the dies being proportioned accordingly; but in every case each roll has its dies loosely applied to it to make a heading movement.

The invention is applicable for shaping from wire other articles than nails which require a bulbing or enlargement at some part of them.

Having now described our invention, what we claim, and desire to secure by Letters Patent, is—

1. A machine of the class described involving opposing rotary rolls provided with pairs or sets of dies having a heading movement circumferentially of the rolls, and independent of the movement of the latter and means for feeding the wire to the dies, substantially as described.

2. In a machine of the class described, the combination of a plurality of rolls provided with sets of dies having a heading or like movement circumferentially and radially of the rolls, a series of wedges carried by the rolls to work at the back of the dies to impart to the said dies their heading movement, a ram to operate the wedges, means for rotating the rolls, means for operating the ram, means for returning the wedges to their normal open position, and means for feeding the wire, substantially as described.

3. A machine of the class described, including two or more opposing rolls provided with pairs or sets of dies having a circumferential heading movement in the direction of rotation of the rolls and independent of the movement of the latter, a plurality of heading-wedges carried by the rolls to move the dies, means for operating the wedges, means for rotating the rolls, and means for feeding the wire to the dies, substantially as described.

4. A machine of the class described comprising two rolls provided with pairs or sets of dies having a circumferential movement in the direction of rotation of the rolls, wedges to operate said dies, bushings to form bearings for said wedges, a ram to operate the said wedges, means for rotating the rolls, means for actuating the ram, and means for feeding the wire, substantially as described.

5. A machine of the class described, having a rotary roll and circumferential die members, one of which is movable circumferentially of said roll.

6. In a machine of the class described, the combination of opposing rolls having pairs or sets of dies capable of movement circumferentially of the rolls and independent of the movement of the latter and at least one of the dies recessed for the entrance of another die adjacent to the working face of the dies, and means for actuating the rolls, substantially as described.

7. A machine for producing nails and other articles from wire by rolling operation, including a pair of rolls provided with sets of dies having a circumferential heading movement in the direction of rotation of the said roll, a series of wedges to operate the dies, bushings forming bearings for the wedges, a ram to operate the wedges, means for operating the ram, means for returning the wedges to their normal open position, means for rotating the roll, and means for feeding the wire.

8. A machine of the class described having opposing rotary rolls and die members movable circumferentially of the rolls and also radially relatively to the body of the rolls.

In testimony whereof we have hereunto set our hands in presence of two subscribing witnesses.

ALBERT LATHAM.
GEO. T. FUERY.

Witnesses:
ROSE WOOLF,
HARRY DAVIS.